United States Patent
Hatch

(10) Patent No.: US 11,084,151 B1
(45) Date of Patent: Aug. 10, 2021

(54) SIDING STRAIGHTENING TOOL AND METHOD OF USE

(71) Applicant: Artie Hatch, Mt. Vernon, TX (US)

(72) Inventor: Artie Hatch, Mt. Vernon, TX (US)

( * ) Notice: Subject to any disclaimer, the term of this patent is extended or adjusted under 35 U.S.C. 154(b) by 248 days.

(21) Appl. No.: 16/415,156

(22) Filed: May 17, 2019

Related U.S. Application Data

(60) Provisional application No. 62/672,863, filed on May 17, 2018.

(51) Int. Cl.
| | |
|---|---|
| *E04C 2/38* | (2006.01) |
| *B25B 27/02* | (2006.01) |
| *B25B 13/22* | (2006.01) |
| *E04F 21/18* | (2006.01) |
| *E04B 1/61* | (2006.01) |
| *B29C 53/00* | (2006.01) |

(52) U.S. Cl.
CPC .............. *B25B 27/02* (2013.01); *B25B 13/22* (2013.01); *B29C 53/00* (2013.01); *E04B 1/54* (2013.01); *E04C 2/38* (2013.01); *E04F 21/1855* (2013.01); *E04F 2201/00* (2013.01); *E04F 2201/03* (2013.01); *Y10T 29/53943* (2015.01)

(58) Field of Classification Search
CPC .............. E04F 21/1855; E04F 2201/00; E04F 2201/03; B25B 13/22; B25B 27/02; B29C 53/00; E04B 1/54; E04C 2/38; Y10T 29/53943; Y10T 29/53909; Y10T 29/53896; Y10T 29/49822; Y10T 29/53796
See application file for complete search history.

(56) References Cited

U.S. PATENT DOCUMENTS

| | | | | |
|---|---|---|---|---|
| 2,111,106 | A * | 3/1938 | Tinnerman | ............. B25B 31/00 29/235 |
| 3,049,336 | A * | 8/1962 | Proffit | .................... E04F 21/22 254/17 |
| 8,454,070 | B2 * | 6/2013 | Bierfreund | ............ F41B 5/1465 294/217 |
| 2017/0051871 | A1 * | 2/2017 | Brzezicki | .................. B25B 5/16 |

* cited by examiner

*Primary Examiner* — Gregory W Adams
(74) *Attorney, Agent, or Firm* — Richard Eldredge; Eldredge Law Firm

(57) ABSTRACT

A siding straightening tool includes two arms engaged with one or more ratchets; one or more spikes extending from the one or more ratchets; a release engaged with one of the two arms and to allow the arms to release; and a mold extending from the one or more arms, the mold having a groove; the two arms clamp together, thereby bringing the spikes toward each other; the mold is ratcheted down to straighten a piece of siding; and the two arms pivots via the one or more ratchets thereby engaging the mold and disengaging the mold with the siding.

2 Claims, 4 Drawing Sheets

SIDING STRAIGHTENING TOOL AND METHOD OF USE

BACKGROUND

1. Field of the Invention

The present invention relates generally to siding installation systems such as for houses, and more specifically, to a siding straightening tool for straightening bowing of a piece of siding prior to installation.

2. Description of Related Art

Siding installation systems are well known in the art and are effective means to install siding on an exterior of a wall. For example, FIG. 1 depicts a conventional siding installation system 101 having a wall 103 configured to receive one or more pieces of siding 105 thereon, the siding having tongue and groove 107 pieces to engage with one another. The siding is secured in place via nails 109 or the like.

One of the problems commonly associated with system 101 is bowing of the siding. When siding bows, such as due to weather, the tongue and groove connections are difficult to align.

Accordingly, although great strides have been made in the area of siding installation systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
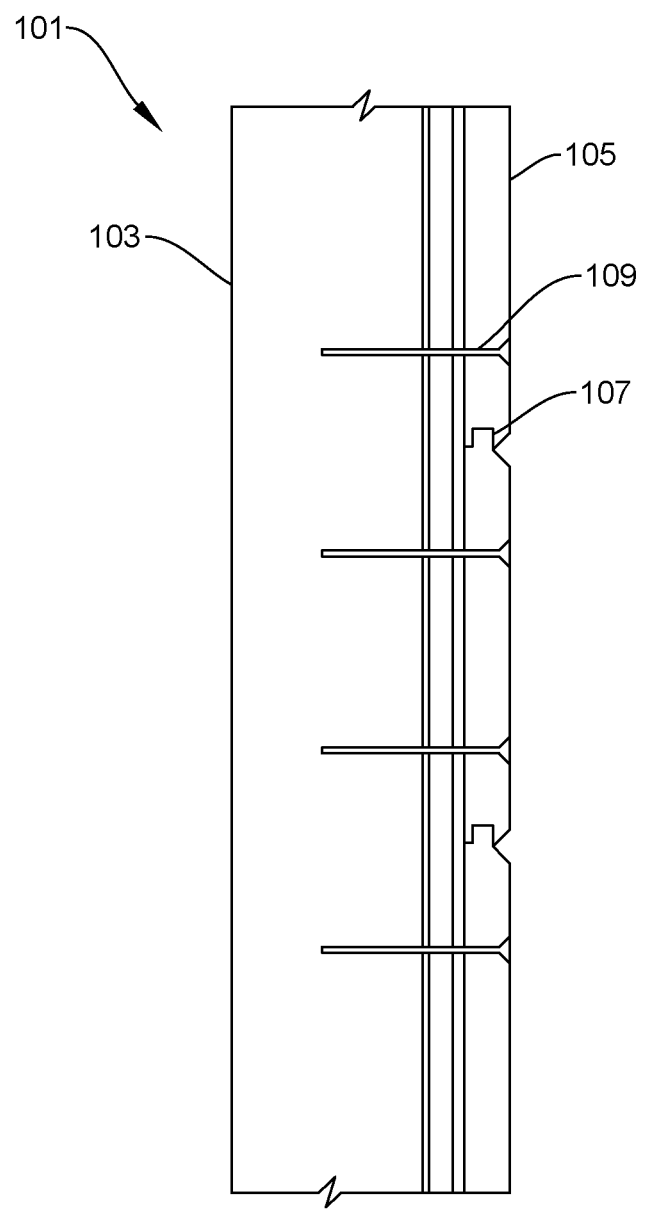
FIG. 1 is a side view of conventional siding installation.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional siding installation. Specifically, the present invention provides a tool that aids in straightening siding prior to installation. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
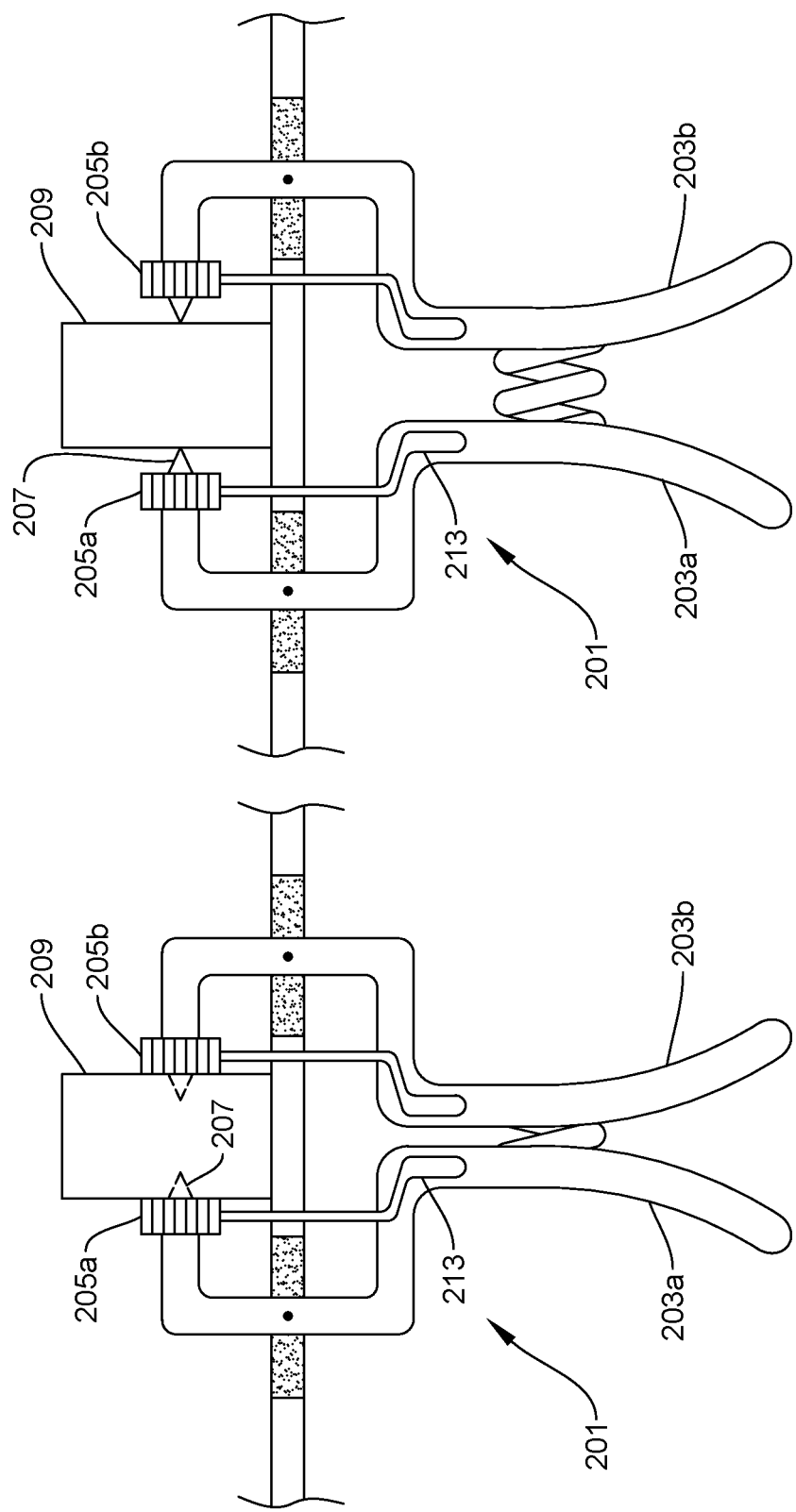
FIGS. 2A and 2B are top views of a siding installation tool common in accordance with a preferred embodiment of the present application.

Referring now to the drawings wherein like reference characters identify corresponding or similar elements throughout the several views, FIGS. 2A and 2B depict top views of a siding installation tool 201 in accordance with a preferred embodiment of the present application. It will be appreciated that tool 201 overcomes one or more of the above-listed problems commonly associated with conventional siding installation.

In the contemplated embodiment, tool 201 includes two arms 203a-b, extending away from ratchets 205a-b, and further configured to open and close one or more spikes 207. The arms are configured to open and close the spikes, thereby engaging and disengaging the spikes 207 with a structure 209, such as a 2x4. As the spikes engage with the structure, the tool is held in place above a piece of siding 211. In some embodiments, one or more buttons or releases 213 are engaged with arms 203a-b, to release the arms, thereby releasing the spikes from the structure.

Figure 3:
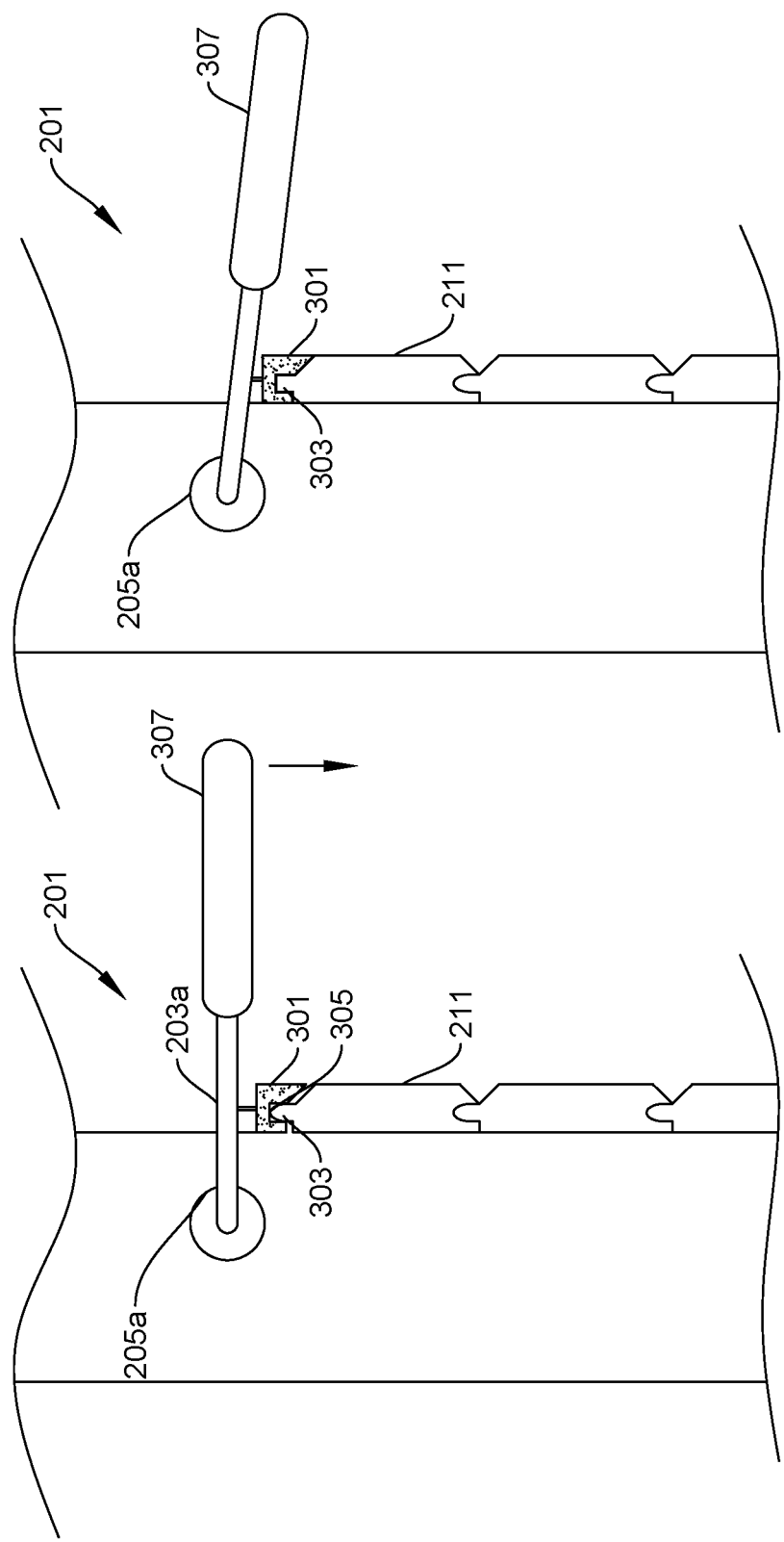
FIGS. 3A and 3B are side views of the tool of FIGS. 2A and 2B.

As shown in FIGS. 3A and 3B, during use of tool 201, the tool is engaged with the structure 209 via the spikes (not shown in FIGS. 3A and 3B). The arms 203a-b, are pushed downward, wherein a mold 301 engages with a tongue 303 of siding 211. As shown, the mold 301 is attached to the arms, thereby providing a means for the user to exert force onto the mold 301 and onto the siding, thereby straightening out the siding. The mold 301 can have a groove 305, which can vary in shape and size to fit various styles of siding. The ratchets 205a, hold the arms and mold in place, thereby allowing for the user to secure the siding, such as via nails and the like. The user can then proceed to release the ratchet, to release the mold from the siding. In some embodiments, arms 203a-b can further include handles 307.

Figure 4:
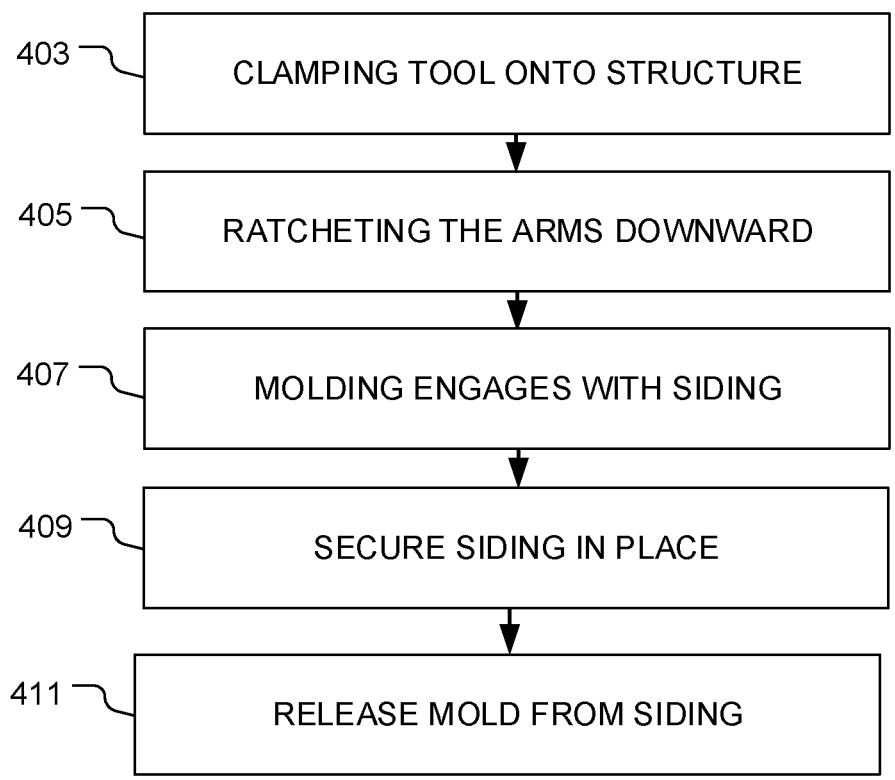
FIG. 4 is a flowchart of the method of use of the tool of FIGS. 2A and 2B.

In FIG. 4, a flowchart 401 is shown for further clarification of the method of use of tool 201. During use, the tool is clamped onto the structure, as shown with box 403. The arms are pushed downward, wherein they pivot relative to the ratchets, as shown with box 405. The mold thereby engages with the siding to straighten out the siding, as shown with box 407. The user can then secure the siding in place and then release the tool, as shown with boxes 409, 411.

It should be appreciated that one of the unique features believed characteristic of the present application is the tool being configured to clamp onto a structure and having a mold ratcheted down to straighten out the siding. It should be appreciated that the tool can be used for exterior siding, interior siding, ceiling siding, or any other application in which siding is used.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A siding straightening tool, comprising:
two arms engaged with one or more ratchets;
one or more spikes extending from the one or more ratchets;
a release engaged with one of the two arms and configured to allow the arms to release; and
a mold extending from the one or more arms, the mold having a groove;
wherein the two arms are configured to clamp together, thereby bringing the spikes toward each other in a first direction;
wherein the mold is ratcheted to straighten a piece of siding; and
wherein the two arms pivot in a second direction via the one or more ratchets thereby engaging the mold and disengaging the mold with the siding, and wherein the second direction is substantially perpendicular to the first direction.

2. The tool of claim 1, wherein the arms further comprise: one or more handles.

* * * * *